July 9, 1929.  L. J. HARRIS  1,720,361
MIXING DEVICE
Filed Oct. 29, 1927
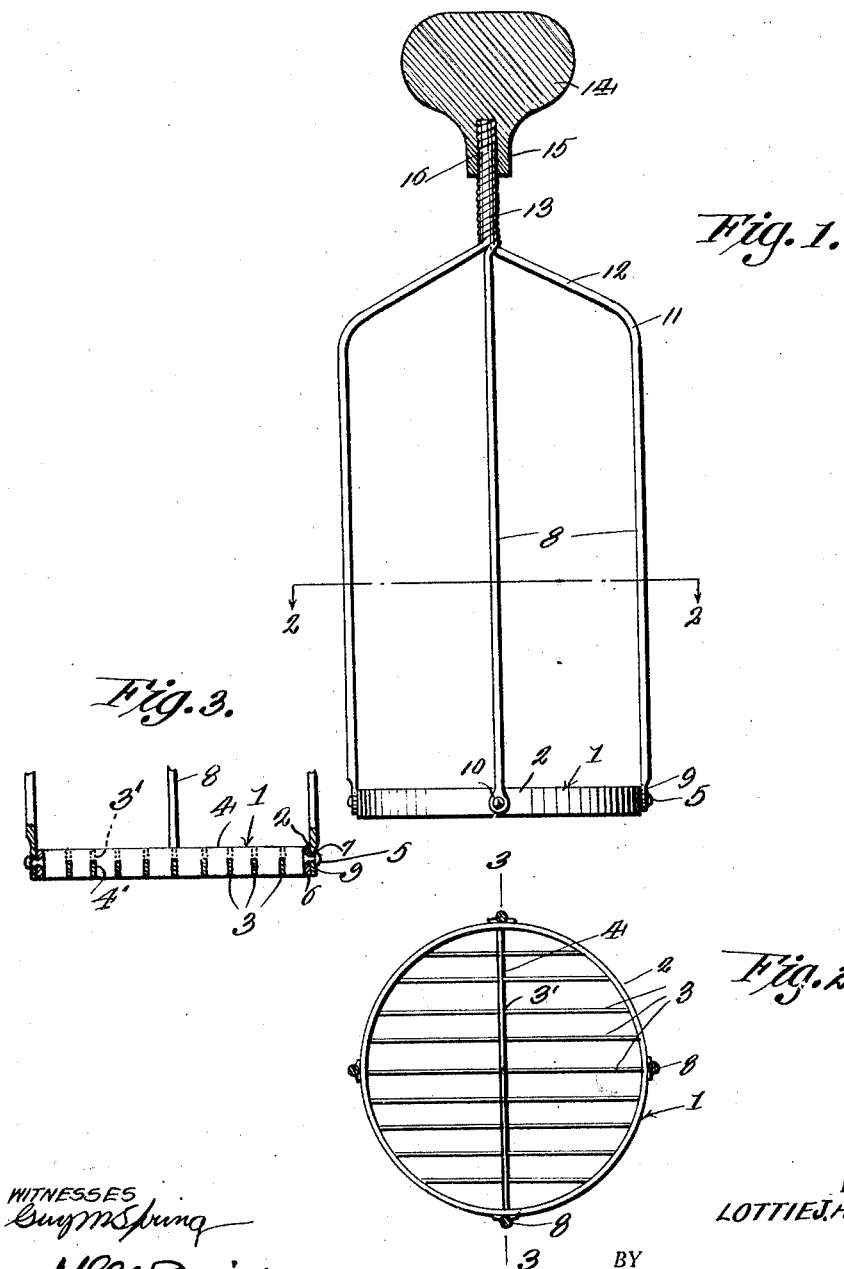
WITNESSES
INVENTOR.
LOTTIE J. HARRIS
BY
ATTORNEY.

Patented July 9, 1929.

1,720,361

UNITED STATES PATENT OFFICE.

LOTTIE J. HARRIS, OF WILLIAMSTOWN, NEW YORK.

MIXING DEVICE.

Application filed October 29, 1927. Serial No. 229,718.

This invention relates to improvements in mixing devices for household use and more particularly to a device designed for use in mixing pastry dough or batter, although the device is capable of employment in mixing other food preparations.

One of the objects of the present invention is to provide a mixing device, of the class described, so constructed that it may be conveniently employed and, will, in use, act to effectively mix the various ingredients of a pastry dough or batter so as to insure of a homogeneous mixture.

Another object of the invention is to provide a device for the purpose stated which may be conveniently employed and which will be simple and substantial in construction and of a character to permit of its being readily cleansed.

While the accompanying drawings and the description which is to follow, constitute a disclosure of the preferred embodiment of the invention, it will be understood that various changes may be made within the scope of what is claimed.

In the accompanying drawings:

Fig. 1 is a view in side elevation of the mixing device embodying the invention;

Fig. 2 is a horizontal sectional view taken substantially on the line 2—2 of Figure 1 looking in the direction indicated by the arrows;

Fig. 3 is a diametric sectional view taken substantially on the line 3—3 of Figure 2.

The device includes a head which is indicated in general by the numeral 1 and which comprises an annular ring or body 2 which is preferably of uniform thickness throughout its circumference and of a height greater than its thickness. The numeral 3 indicates a plurality of mixing or agitating members which are preferably in the form of strips of sheet metal of varying length and which are arranged in parallel relation to each other, within the annular body 2, and chordal to the said body, one of the members 3, namely the intermediate member, being so arranged as to intersect the axis of the body 2, and the other members being arranged at opposite sides of the said intermediate member and equi-distantly spaced with respect thereto and with respect to one another throughout the series. The ends of the strips comprising the members 3 are permanently and securely united, in any suitable manner, as for example by welding, or soldering, to the inner surface of the annular body 2, the members being disposed in vertical position as clearly shown in Figures 2 and 3 of the drawings and having their upper and lower edges flush with the upper and lower sides of the annular body 2. In order that the intermediate portions of the members 3 may be reinforced and the said members relieved of strain, to a considerable extent, a bracing bar 4 is disposed to extend diametrically within the body 2 and at right angles to the members 3, intersecting these members at points midway between their ends, the ends of the bar 4 being secured in any suitable manner to the body 2 as for example by the formation of studs 6 at the ends of the bar 4, which studs project through openings 7 in the member 2 and are headed as indicated by the numeral 5. The bar 4 is formed in its lower edge, at its points of intersection with the members 3, with notches 4', and the members 3 are formed in their upper edges, at their points of intersection with the bar 4, with similar notches 3', this construction providing for interlocking of the members 3 and the bar 4.

The device further includes a frame which preferably consists of a plurality of upright members indicated by the numeral 8 and these members are preferably formed from lengths of wire and have their lower ends flattened to provide ears 9 which are positioned against the outer side of the annular body 2 of the head 1. Preferably the studs 6 of the bar 4 will extend through the ears 9 of two of the diametrically oppositely located frame members 8, so that the said ends of these frame members are in this manner secured to the head 1, and the corresponding ends of the other members 8 are secured in place by rivets 10. Near their upper ends, the frame members 8 are bent as at 11 to provide upwardly and inwardly converging portions 12, and at the juncture of these portions, and therefore in a vertical line with the axis of the head 1, the wires comprising the members 8 are intertwisted to form a vertically extending shank 13 which is in axial alinement with the said head 1, the intertwisting of these portions of the wires serving to connect the frame members and thus render the frame rigid. The twisted portions of the wires may be formed to provide a handle, or, as illustrated in Figure 1 of the drawings, a handle comprising a wooden hand knob 14, may be associated with the shank 13 of the device, the said knob 14 being provided with a downwardly extending shank 15 which is formed with an internally threaded socket 16 into which the shank 13 is fitted. At this point it will be understood that if the handle knob 14 is made of soft wood, it will in all probability be unnecessary to thread the socket 16 inasmuch as the socket may be made of slightly less diameter than the maximum diameter of the shank 13, and, due to the intertwisting of the upper portions of the wire strains comprising the frame members 8, in forming the said shank 13, the said intertwisted portions will be caused to assume a helical form and therefore, if pressure is exerted against the shank 13 and handle 14, at the time the upper end of the shank is fitted into the socket in the handle shank, the parts may be relatively rotated, and the outer sides of the coils formed in the intertwisting of the upper portions of the wires comprising the frame members 8, will bite into the wall of the bore sufficiently to securely anchor the handle knob upon the said shank 13.

From the foregoing description of the invention it will be understood that the device may be conveniently employed in mixing pastry dough or batter, the up and down movement of the head 1 of the device in the dough or batter, and the passage of the body 2 of the said head and the members 3, up and down through the dough or batter, serving to thoroughly mix the ingredients thereof. It will likewise be evident that the bar 4 constitutes not only a means for bracing the members 3, but it likewise assists in mixing the ingredients of the dough or batter, in the use of the device in the manner stated.

The device embodying the invention is also particularly well adapted for use in incorporating shortening in dough.

Having thus described the invention, what I claim is:

In a mixing device of the class described, an annular head, a plurality of parallel flat sided mixing members extending across the head within the bounds of the same and arranged in vertical position, a frame extending upwardly from the head, a handle at the upper portion of the frame, a bracing bar extending across the head and intersecting the said mixing members and studs carried by the ends of the bracing bar and extending through the head and the lower ends of oppositely located ones of the members of the frame, the outer ends of the studs being headed to anchor such frame members to the head.

In testimony whereof I affix my signature.

LOTTIE J. HARRIS.